United States Patent [19]

Sato et al.

[11] 4,221,952

[45] Sep. 9, 1980

[54] ELECTRIC DISCHARGE MACHINING METHOD

[75] Inventors: Kunihiko Sato, Owari-Asahi; Tetsuro Urata, Nagoya; Mitsugi Kawano; Terumasa Jinba, both of Fukuyama; Tetsuhiro Asamoto, Nagoya; Takeo Uebayashi, Fukuyama, all of Japan

[73] Assignees: Mitsubishi Denki Kabushiki Kaisha; Nippon Kokan Kabushiki Kaisha, both of Tokyo, Japan

[21] Appl. No.: 930,010

[22] Filed: Aug. 1, 1978

[30] Foreign Application Priority Data

Aug. 11, 1977 [JP] Japan .................................. 52-96513
Aug. 11, 1977 [JP] Japan .................................. 52-96514

[51] Int. Cl.² .............................................. B23P 1/14
[52] U.S. Cl. .................................. 219/69 G; 219/69 M
[58] Field of Search ................. 219/69 G, 69 M, 69 C

[56] References Cited

U.S. PATENT DOCUMENTS

| | | | |
|---|---|---|---|
| 3,694,599 | 9/1972 | Davis | 219/69 G |
| 3,825,714 | 7/1974 | Marendaz | 219/69 M |
| 3,997,753 | 12/1976 | Inoue | 219/69 M |
| 4,021,635 | 5/1977 | Losey et al. | 219/69 G |

Primary Examiner—Bruce H. Reynolds
Assistant Examiner—Clifford C. Shaw
Attorney, Agent, or Firm—Fleit & Jacobson

[57] ABSTRACT

There is disclosed an electric discharge machining method in which the discharge working gap between an electrode and a work piece is automatically adjusted to prevent the occurrence of a streaky pattern in the surface of the work piece due to variation in the amount of machining. After a plurality of high voltage pulses have been applied for a predetermined time across the working gap, a low voltage pulse is applied across the working gap. In response to the application of the low voltage pulse, the feeding of the electrode is controlled by a pulse motor in a direction to reduce the working gap, and as soon as the discharge is started the feed control is stopped and the discharge machining is then effected in response to the application of high voltage pulses.

4 Claims, 2 Drawing Figures

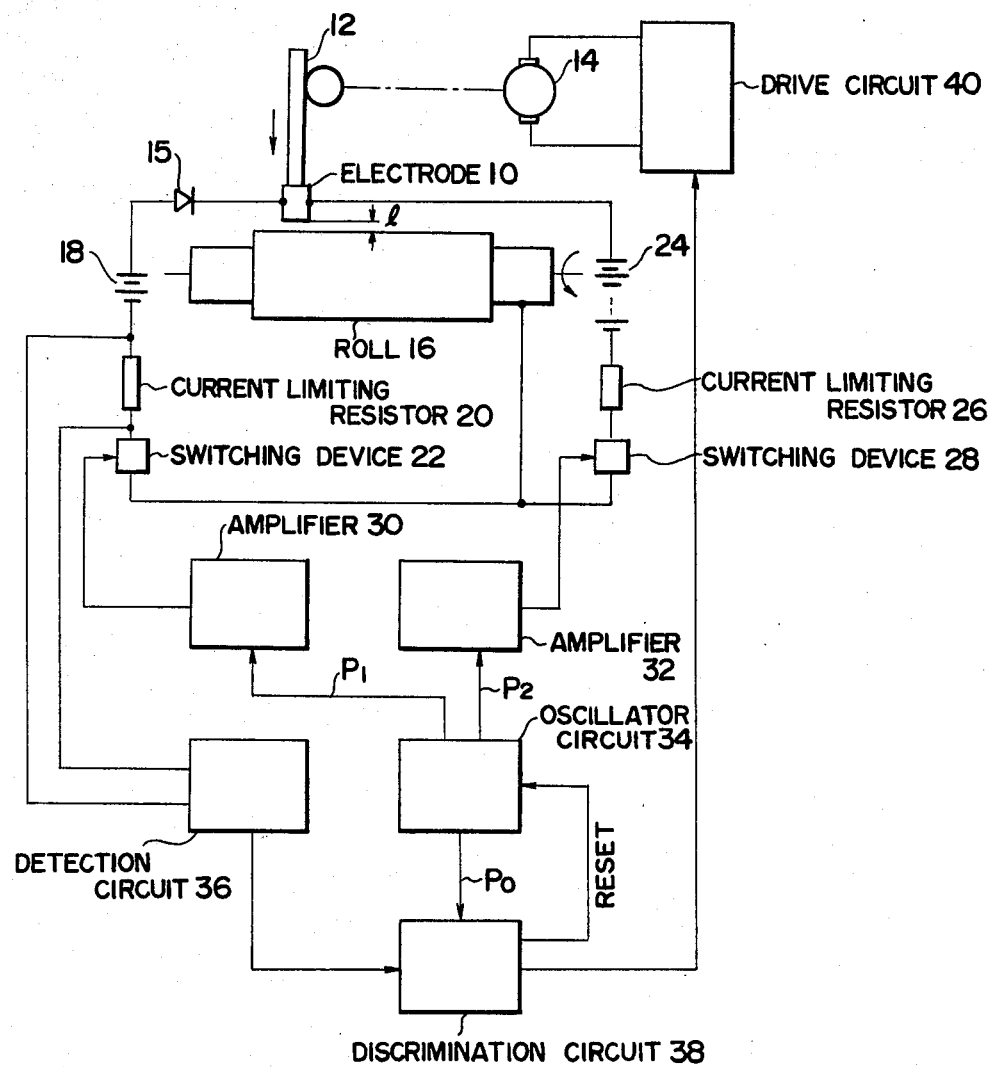

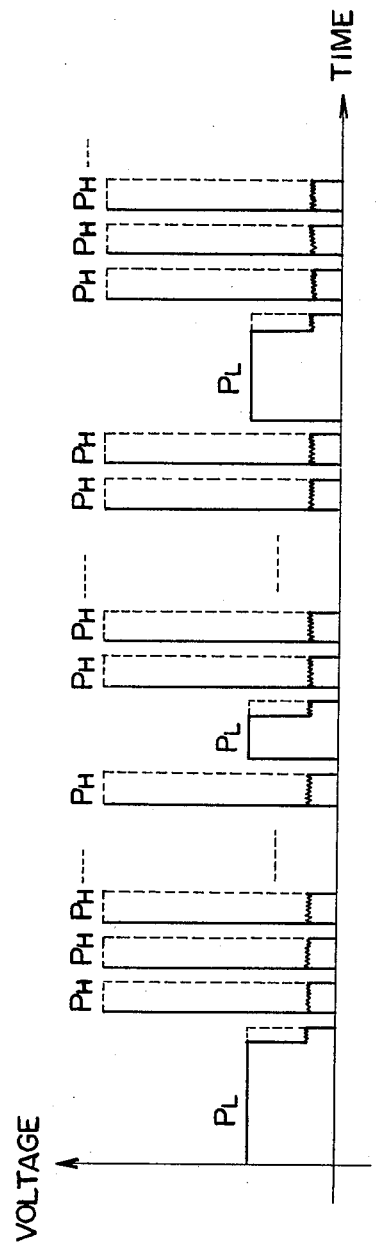

4,221,952

ELECTRIC DISCHARGE MACHINING METHOD

BACKGROUND OF THE INVENTION

The present invention relates to electric discharge machining methods for satinizing with a desired roughness the surface of a work piece in roll or plate form by means of electric discharges, and more particularly the invention relates to a method of controlling the feeding of an electrode to control the working gap between the electrode and a work piece at a value capable of maintaining a stable electric discharge machining condition.

In the past, methods of giving a satin finish to the surface of for example strip steel rolling rolls, particularly cold rolling rolls, have been used in which hard metal particles such as short or grit are thrown at the polished roll surfaces to form impressions in the roll surfaces, and recently attempts have been made to accomplish this type of machining by means of electric discharge machining. As is well known, the electric discharge machining is a method of machining the surface of a work piece in which an insulating liquid such as kerosene is introduced into a narrow working gap between an electrode and a work piece, and a pulse waveform voltage is periodically applied across the electrode and the work piece to cause discharges therebetween and effect the machining. By repeatedly carrying out this electric discharge machining at the roll surface while rotating the roll in the circumferential direction and simultaneously gradually moving the electrode along the rotary shaft of the roll, it is possible to continuously subject the roll surface to a spiral satin finishing operation and to form discharge impressions all over the roll surface. This is the process of uniformly giving a satin finish to the surface of a roll by means of electric discharge machining. As compared with the mechanical impressions formed by directing metal particles against the roll surface, the satin finish given by the electric discharge machining is advantageous in that the surface roughness can be adjusted as desired by changing the machining conditions, that the shape of the finished roll is extremely uniform and not affected by the manufacturing method and hardness of the roll, that the metal structure in the roll surface is hardened by the electric discharges, thus making it best suited for use as a rolling roll and so on.

With the electric discharge dull finishing methods which have heretofore been proposed, hydraulic servo control methods have been used for controlling the feeding of an electrode. In a typical method of this type, the voltage across the working gap formed by an electrode and a work piece or roll is compared with a predetermined reference voltage, and a hydraulic actuation system is controlled in response to the difference to maintain the working gap at a constant value.

However, as is well known in the art, in this type of hydraulic servo control system the electrode is repeatedly oscillated to each side of a reference position, and consequently an excessive feeding, hunting or the like is caused by inertia, thus causing the amount of machining to vary with time. As a result, while no serious problem will be caused in the case of the ordinary electric discharge machining, where the surface of a roll is machined to a slight degree while moving an electrode and the roll or work piece relative to each other, a streaky pattern will be caused in the surface of the roll by such variation with time of the amount of machining due to nonuniformity in the discharge conditions. Of course, this variation in the amount of machining is so small that the resulting streaky pattern cannot be recognized by simply looking at the finished surface with the naked eye, and the streaky pattern will be recognized only with the aid of, for example, a chalk test in which chalk powder is applied to the roll surface, or another test employing oil stone. However, if the roll is used as a strip steel rolling roll for final rolling purposes, the strip steel produced will still be affected by such streaky pattern, and the strip steel will be rejected as an off-grade product.

SUMMARY OF THE INVENTION

It is an object of the present invention to provide an electric discharge machining method capable of preventing the occurrence of a streaky pattern in the surface of a roll which pattern is encountered in the prior art methods of machining the surface of rolls or the like by electric discharges.

It is another object of the invention to provide an electric discharge machining method in which each working pulse train comprises a low voltage pulse and high voltage pulses so that the feeding of an electrode is controlled to provide a working gap in which a discharge is initiated by the application of a low voltage pulse and the electric discharge machining condition by the application of high voltage pulses is maintained constant irrespective of wear of the electrode and variation in the working gap.

It is still another object of the invention to provide an electric discharge machining method in which the control of feeding of the electrode to reduce the working gap is effected by detecting a change in the working current which is dependent on the occurence of a discharge by the application of a low voltage pulse.

It is still another object of the invention to provide an electric discharge machining method in which a pulse motor is used for electrode feed control purposes to suppress oscillation of the electrode and thereby to maintain a uniform electric discharge machining condition.

Other and further objects, features and advantages of the invention will appear more fully from the following description taken in conjunction with the accompanying drawings.

BRIEF DESCRIPTION OF THE DRAWINGS

FIG. 1 is a block diagram showing the construction of an apparatus for performing an electric discharge machining method according to the invention.

FIG. 2 is a time chart showing the waveform of voltages applied across an electrode and a work piece in accordance with the method of this invention.

DESCRIPTION OF THE PREFERRED EMBODIMENT

Referring first to FIG. 1, numeral 10 designates a working electrode, 12 a spindle holding the electrode 10, 14 a pulse motor for moving the spindle 12 to control the feeding of the electrode 10, and 16 a roll or work piece which is positioned opposite to the electrode 10 with a working gap l therebetween, and which is subjected to a satin finishing operation.

Means for applying working pulses to the working electrode 10 comprise a DC power source 18 for low voltage pulse, a current limiting resistor 20 for low voltage pulse, a switching device 22 comprising, for example, a transistor for applying low voltage pulse, a DC power source 24 for high voltage pulse, a current limiting resistor 26 for high voltage pulse, and a switching device 28 comprising, for example, a transistor for applying high voltage pulses. Connected between the positive terminals of the DC power sources 18 and 24 through the electrode 10 is a unidirectional rectifying device 15 comprising a diode or the like which prevents the flow of reverse current to the low voltage DC power source 18 from the high voltage DC power source 24 upon actuation of the switching device 28. Numeral 30 designates an amplifier circuit for activating the low voltage pulse switching device 22, and numeral 32 designates an amplifier circuit for actuating the high voltage pulse switching device 28. The amplifier circuits 30 and 32 are responsive to the rectangular pulses generated from an oscillator circuit 34 to actuate the switching devices 22 and 28. The rectangular pulse outputs $P_1$ and $P_2$ from the oscillator circuit 34 are generated in such a manner that the rectangular pulses $P_2$ for applying high voltage pulses are generated for a predetermined time, and the pulses are followed by the generation of the low voltage pulse application rectangular pulse $P_1$ which in turn is maintained until the application of a reset pulse.

A detection circuit 36 is provided to detect a working current caused by the application of a low voltage pulse and it receives the voltage developed across the resistor 20. A discrimination circuit 38 is responsive to the detection signal from the detection circuit 36 to discriminate the presence of a working current upon application of a low voltage pulse, that is, an electrode feed control start command is generated in response to a rectangular pulse $P_0$ generated from the oscillator circuit 34 in synchronism with the rectangular pulse $P_1$, and an electrode feed control stop command is generated by discriminating through the detection of a working current the fact that a discharge has been started by the application of a low voltage pulse. The discrimination circuit 38 also applies a reset signal to the oscillator circuit 34 in synchronism with the electrode feed control stop command, so that the generation of the rectangular pulse $P_1$ for low voltage pulse is stopped and the generation at a predetermined period of rectangular pulses $P_2$ for high voltage pulses is initiated. A drive circuit 40 controls the feeding of the electrode 10 by moving the spindle 12 through the pulse motor 14 in response to the electrode feed control start and stop commands from the discrimination circuit 38.

FIG. 2 shows the voltage pulse waveforms applied across the electrode 10 and the roll 16 in FIG. 1 for performing the method of this invention, and it will be seen that after high voltage pulses $P_H$ have been continuously applied for a predetermined time a low voltage pulse $P_L$ is applied, and that this alternate application of the high and low voltage pulses is effected repeatedly. Since a discharge is immediately started in response to the application of a high voltage pulse $P_H$, the voltage waveform of the high voltage pulse $P_H$ comprises a rising portion or impulse portion and a succeeding discharge voltage portion which lasts at a low voltage. On the other hand, since the control of feeding of the electrode 10 is effected in response to the application of a low voltage pulse $P_L$ in a direction to reduce the discharge gap so that a discharge is initiated when the electrode gap attains a discharge gap for the low voltage pulse $P_L$ as will be described in connection with the description of the operation, the waveform of the low voltage pulse $P_L$ comprises a discharge voltage portion which lasts at a low voltage. In the Figure, the dotted portions indicate the imaginary voltage waveforms without discharge and the dotted portions are consumed as discharge energy.

Next, the operation of the apparatus of FIG. 1 for performing the method of this invention will now be described with reference to FIG. 2.

The roll 16 is rotated at a constant speed by a drive unit which is not shown, and the control of traverse feeding of the electrode 10 is effected at a desired speed by a traverse feeding mechanism which is not shown. In this condition, a voltage pulse train such as shown in FIG. 2 is applied across the electrode 10 and the roll 16. In other words, the switching device 28 is turned on and off by the oscillator circuit 34 through the amplifier circuit 32 for a predetermined period of time, and consequently high voltage pulses $P_H$ are applied across the electrode 10 and the roll 16 thus giving a satin finish to the surface of the roll 16 by electric discharges. After the high voltage pulses $P_H$ have been applied for the predetermined time, the switching device 22 is turned on by the oscillator circuit 34 through the amplifier circuit 30, and consequently a low voltage pulse $P_L$ is applied across the electrode 10 and the roll 16. At the same time, a feed control start pulse $P_0$ is applied from the oscillator circuit 34 to the discrimination circuit 38, so that the discrimination circuit 38 applies an electrode feed control start command to the drive circuit 40, and consequently the pulse motor 14 is actuated, thus moving the spindle 12 and controlling the feeding of the electrode 10 in a direction to reduce the working gap l. Also, the magnitude of the working current due to the application of the low voltage pulse is detected by the detection circuit 36 and applied to the discrimination circuit 38 which monitors it. When the working gap is decreased in response to the electrode feed control, a discharge is caused by the low voltage pulse $P_L$ applied and the working current is increased rapidly. When the discharge starts, it is detected by the discrimination circuit 38 so that a feed control stop command is applied to the drive circuit 40 and the pulse motor 14 is stopped, thus holding the electrode 10 in the position at which the discharge was caused. At the same time that the feed control stop command is generated, the discrimination circuit 38 applies a reset signal to the oscillator circuit 34, and the generation of rectangular pulse $P_1$ for the low voltage pulse is stopped and changed to the generation of high voltage pulses $P_2$ for high voltage pulses. Thereafter, the same process is repeated. When a discharge is caused upon application of a low voltage pulse $P_L$, the electrode feed control described is not performed. In this way, the working gap l is held at a length which permits a discharge by the application of a low voltage pulse $P_L$, and consequently discharges are effectively produced by the continuous application of the succeeding high voltage pulses $P_H$.

Further, by virtue of the fact that the roll or work piece is rotated in the method of this invention, an unworked work surface always comes out so that there is no possibility of chips accumulating in the working gap, and a change in the working gap is practically dependent entirely on the consumption rate of the electrode. The results of the actual work tests show that, when a roll of 620 mm in diameter was machined to obtain a surface roughness of 18 $\mu$Rmax by using a copper electrode of 50 mm in width and 2 mm in thickness and the roll surface peripheral speed of 6 m/min, under the conditions causing the maximum consumption of the electrode, the consumption rate of the electrode was 92µ per roll revolution and the consumption rate with respect to the distance of relative movement between the electrode and the roll was 0.047 µ/min since the roll diameter was 620 mm. Assuming that the voltages of the low and high voltage pulses are 80 volts and 300 volts, the difference between their discharge initiating gaps will be over 10µ, and consequently variation of the order of 5µ in the gap will practically cause no difference in the ratio of the discharging pulses to the applied pulses. In other words, no change in the amount of machining will result if the electrode feeding mechanism is fixed for the distance of travel of 200 mm for the electrode traverse feed.

Further, in accordance with the method of this invention, the occurrence of a streaky pattern in the surface of a roll can be prevented for the following ground. As mentioned previously, electrode gap detecting low voltage pulses having a lower voltage value than discharge machining high voltage pulses are inserted at a predetermined period among the high voltage pulses, and the pulses are applied across the electrodes. When a discharge is caused by the application of a low voltage pulse, the electrode 10 is held in the position where it was at the time of the discharge, whereas when no discharge is caused, a feed motion is imparted to the electrode 10 by the pulse motor 14 to reduce the electrode gap, and in this way the electrode gap is always held in a condition which causes a discharge in response to the application of each discharge voltage pulse. In other words, practically every one of the applied discharge voltage pulses causes a discharge and consequently the amount of machining is always held constant, thus preventing the occurence of a streaky pattern. The efficiency of machining is also improved greatly with the resulting reduction in the machining time. Moreover, this electrode feed control cannot be effected by the ordinary hydraulic servo control system and the control can be effected only by the use of a pulse motor which features accurate feed and large braking force. While, in accordance with the method of this invention, feed motion if not imparted to the electrode to increase the electrode gap and consequently the method of this invention is not suitable for use in the ordinary electric discharge machining since it tends to cause accumulation of chips in the electrode gap, in the case of a machining such as electric discharge dull finishing in which an electrode and a work piece or roll are always moved relative to each other and the machining is effected only in the surface of the roll, there is no need to increase the electrode gap since there is practically no danger of the chips accumulating in the gap, and the amount of eccentricity in the roll rotation is very small as compared with the electrode gap. In other words, in the case of the electric discharge dull finishing, the best way is to stop the movement of the electrode during the stable machining and to advance the electrode before the consumption of the electrode due to the machining increases the electrode gap and prevents the occurrence of discharge. The electrdic discharge dull finishing tests conducted by the inventor on rolling rolls (620φ) showed that the optimum voltage values for the discharge machining high voltage pulses and electrode gap detecting low voltage pulses were respectively 300 V and 200 V.

While the method of this invention has been illustrated and described in connection with giving a satin finish to the surface of a roll, the invention is not intended to be limited thereto, and it is of course possible to use the method in applications in which the work area of a work piece in plate form is moved relative to the electrode to give a satin finish to the surface of the work piece. The similar functions and effects may also be obtained by arranging so that the electrode is moved relative to the work piece.

It will thus be seen from the foregoing that in accordance with the method of this invention, in the production of a satin finish on the surface of a work piece, the working gap is fixed as far as possible without undesired oscillation of the working gap and moreover the amount of machining is held constant, thus preventing the occurence of a streaky pattern in the work surface and thereby producing an excellent finished surface.

What is claimed is:

1. In a method wherein a working gap is formed between an electrode and a work piece, said working gap is adjusted by controlling the feeding of said electrode, and said electrode and a work area of said work piece are moved relative to each other, whereby to give a satin finish to a surface of said work piece, the improvement comprising the steps of:
    applying across said working gap voltage pulse trains each comprising a plurality of high voltage pulses and a low voltage pulse;
    controlling the feeding of said electrode by said low voltage pulse to reduce said working gap until a low voltage discharge is caused;
    detecting a working current caused by the application of said low voltage pulse so as to detect said low voltage discharge from a change in said working current during said low voltage pulse application;
    stopping the control of feeding of said electrode in response to the detection of said low voltage discharge during the control of feeding of said electrode; and
    applying said high voltage pulses for a predetermined period of time to cause high voltage discharges, whereby to give a satin finish to the surface of said work piece by discharge machining.

2. A method according to claim 1, wherein the control of feeding of said electrode in response to the application of said low voltage pulse is effected by a pulse motor.

3. A method according to claim 1, wherein said detected change in said working current comprises an increase in said working current during said low voltage discharge.

4. A method according to claim 1, further comprising the step of providing a current limiting resistor connected in series between said electrode and said work piece, said step of detecting a working current comprising measurement of said current through said current limiting resistor during application of said low voltage pulse.

* * * * *